(12) United States Patent
Crutchfield

(10) Patent No.: US 10,907,651 B2
(45) Date of Patent: Feb. 2, 2021

(54) FAN TRACK LINER SUBASSEMBLY ANGLED UPTURN JOINT

(71) Applicant: Rolls-Royce Corporation, Indianapolis, IN (US)

(72) Inventor: Jeff Crutchfield, Indianapolis, IN (US)

(73) Assignee: ROLLS-ROYCE CORPORATION, Indianapolis, IN (US)

( * ) Notice: Subject to any disclaimer, the term of this patent is extended or adjusted under 35 U.S.C. 154(b) by 258 days.

(21) Appl. No.: 15/403,411

(22) Filed: Jan. 11, 2017

(65) Prior Publication Data

US 2017/0198717 A1    Jul. 13, 2017

Related U.S. Application Data

(60) Provisional application No. 62/277,815, filed on Jan. 12, 2016.

(51) Int. Cl.
```
F04D 29/52       (2006.01)
F04D 29/02       (2006.01)
F01D 21/04       (2006.01)
```

(52) U.S. Cl.
CPC ......... F04D 29/526 (2013.01); F01D 21/045 (2013.01); F04D 29/023 (2013.01); F05D 2220/36 (2013.01); F05D 2230/23 (2013.01); F05D 2250/15 (2013.01); F05D 2260/36 (2013.01); F05D 2300/224 (2013.01); F05D 2300/603 (2013.01); F05D 2300/6012 (2013.01)

(58) Field of Classification Search
CPC ...... F04D 29/526; F04D 29/023; F04D 29/40; F04D 29/52; F01D 21/045; F01D 25/24; F05D 2220/36; F05D 2230/23; F05D 2250/15; F05D 2260/36; F05D 2300/224; F05D 2300/6012
USPC .................................................. 415/9, 215.1
See application file for complete search history.

(56) References Cited

U.S. PATENT DOCUMENTS

| | | | | |
|---|---|---|---|---|
| 4,540,336 A | * | 9/1985 | Cawley | F01D 11/122 415/173.4 |
| 5,336,044 A | * | 8/1994 | Forrester | F01D 21/045 415/196 |
| 6,652,222 B1 | | 11/2003 | Wojtyczka et al. | |
| 7,094,033 B2 | | 8/2006 | Pauley et al. | |
| 7,325,771 B2 | * | 2/2008 | Stulc | B64C 1/069 244/119 |
| 7,328,771 B2 | * | 2/2008 | Costa | B64D 33/02 181/213 |
| 7,604,199 B2 | * | 10/2009 | McMillan | F01D 21/045 244/53 R |
| 8,016,543 B2 | * | 9/2011 | Braley | F01D 21/045 415/173.4 |

(Continued)

*Primary Examiner* — Kenneth J Hansen
*Assistant Examiner* — Jason Fountain
(74) *Attorney, Agent, or Firm* — Brinks Gilson & Lione

(57) ABSTRACT

A machine having a rotor that is radially bounded at least in part by a containment assembly. The containment assembly may comprise a casing and a containment liner. The casing may have a radially inner surface facing a rotor of the machine. The containment liner may be formed form a plurality of panels bonded to the radially inner surface of the casing. The panels may form joints between adjacent leading and trailing panels relative to the direction of rotation of said rotor. At least one joint includes a portion of a trailing panel positioned radially outboard of a portion of the leading upstream panel.

19 Claims, 10 Drawing Sheets

(56) References Cited

U.S. PATENT DOCUMENTS

| | | | |
|---|---|---|---|
| 8,046,915 B2 | 11/2011 | Xie et al. | |
| 8,061,966 B2 | 11/2011 | Xie et al. | |
| 8,403,624 B2 | 3/2013 | Xie et al. | |
| 8,672,609 B2 | 3/2014 | Lussier et al. | |
| 8,714,922 B2* | 5/2014 | Twell | F01D 9/041 |
| | | | 415/210.1 |
| 8,757,958 B2 | 6/2014 | Lussier | |
| 9,051,054 B2 | 6/2015 | Vauchel | |
| 9,677,570 B2* | 6/2017 | Care | F01D 21/045 |
| 10,125,788 B2* | 11/2018 | Lin | B32B 5/02 |
| 2005/0067788 A1* | 3/2005 | Liang | F01D 11/005 |
| | | | 277/409 |
| 2006/0024154 A1* | 2/2006 | Costa | B64D 33/02 |
| | | | 415/170.1 |
| 2006/0060705 A1* | 3/2006 | Stulc | B64C 1/069 |
| | | | 244/119 |
| 2006/0165519 A1* | 7/2006 | McMillan | F04D 29/522 |
| | | | 415/173.1 |
| 2009/0067979 A1* | 3/2009 | Braley | F01D 21/045 |
| | | | 415/9 |
| 2009/0155065 A1* | 6/2009 | Xie | F01D 11/122 |
| | | | 415/200 |
| 2010/0037616 A1* | 2/2010 | Twell | F01D 9/041 |
| | | | 60/751 |
| 2014/0086734 A1* | 3/2014 | Xie | F01D 25/24 |
| | | | 415/200 |
| 2014/0186165 A1* | 7/2014 | Robertson, Jr. | F04D 29/023 |
| | | | 415/177 |
| 2015/0147156 A1* | 5/2015 | Care | F01D 21/045 |
| | | | 415/9 |
| 2015/0354408 A1* | 12/2015 | Snyder | F01D 21/045 |
| | | | 415/196 |
| 2017/0198714 A1* | 7/2017 | Lin | B32B 5/02 |

* cited by examiner

FAN TRACK LINER SUBASSEMBLY ANGLED UPTURN JOINT

CROSS-REFERENCE TO RELATED APPLICATIONS

This application claims the benefit of U.S. Provisional Application No. 62/277,815, filed Jan. 12, 2016.

FIELD OF THE DISCLOSURE

The present disclosure is direct to systems and methods for providing containment assemblies for rotating machines.

BACKGROUND

Fluid propulsion devices achieve thrust by imparting momentum to a fluid called the propellant. An air-breathing engine, as the name implies, uses the atmosphere for most of its propellant. The gas turbine produces high-temperature gas which may be used either to generate power for a propeller, fan, generator or other mechanical apparatus or to develop thrust directly by the expansion and acceleration of the hot gas in a nozzle. In any case, an air breathing engine continuously draws air from the atmosphere, compresses it, adds energy in the form of heat, and then expands it in order to convert the added energy to shaft work or jet kinetic energy. Thus, in addition to acting as propellant, the air acts as the working fluid in a thermodynamic process in which a portion of the energy is made available for propulsive purposes or work.

Typical gas turbine engines include at least two air streams. All air utilized by the engine initially passes through a fan prior to being split into the two or more air streams. The inner air stream is referred to as core air and passes into the compressor portion of the engine where it is compressed. The core air then is fed to the combustor portion of the engine where it is mixed with fuel and the fuel is combusted. The combustion gases are then expanded through the turbine portion of the engine that extracts energy from the hot combustion gases. The extracted energy is used to power the compressor, the fan and other accessory systems. The remaining hot gases then flow into the exhaust portion of the engine and may be used to produce thrust for the aircraft.

The outer air stream (also known as the bypass air stream) bypasses the engine core and is pressurized by the fan. Typically, no other work is done on the outer air stream as it flows axially in the engine but outside the core. Downstream of the turbine, the bypass air stream is used to cool engine hardware in the exhaust system. When additional thrust is required (or demanded), some of the bypass air stream may be redirected to an augmenter (afterburner) where it is mixed with the core air stream and fuel to provide the additional thrust to the aircraft. Referring to the drawings wherein similar reference numerals denote like elements throughout the various views, FIG. 1 shows a general orientation of a turbofan engine in a cut away view. In the turbofan engine shown, the flow of the air is generally axial. The position of components along the engine axis may be described using the terms "upstream" and "downstream" relative to the direction of airflow. Upstream refers to positions toward the engine inlet and downstream refers to positions toward the engine exhaust. Additionally, outward/outboard and inward/inboard refer to a lateral or radial direction perpendicular to the axial direction. For example, in the gas turbine engine of an aircraft, the bypass duct is outboard of the core duct. Typically the ducts are generally circular and co-axial.

The ambient inlet airflow 12 enters inlet fan duct 14 of turbofan engine 10, through the guide vanes 15, passes by fan spinner 16 and through fan rotor (fan blade) 42. The airflow 12 is split into primary (core) flow stream 28 and bypass flow stream 30 by upstream splitter 24 and downstream splitter 25. The bypass flow stream 30 along with the core/primary flow stream 28 is shown, the bypass stream 30 being outboard of the core stream 28. The inward portion of the bypass stream 30 and the outward portion of the core streams are partially defined by splitters 24 and 25 upstream of the compressor 26. The fan 42 has a plurality of fan blades.

As shown in FIG. 1 the fan blade 42 shown is rotating about the engine axis into the page, therefor the low pressure side of the blade 42 is shown, the high pressure side being on the opposite side of the blade. The high pressure and low pressure sides may also be known as the leading and trailing edges of the fan blade 42. The core flow stream 28 flows through compressor 26. The compressed air typically passes through an outlet guide vane to reduce or eliminate swirling motion or turbulence, a diffuser where air spreads out, and a compressor manifold to distribute the air in a smooth flow. The core flow stream 28 is then mixed with fuel in combustion chamber 35 and the mixture is ignited and burned. The resultant combustion products flow through turbines 38 that extract energy from the combustion gases to turn fan rotor 42, compressor 26 and provide any shaft work by way of a turbine shaft. The gases, passing an exhaust cone, expand through an exhaust nozzle 43 to produce thrust. The core flow stream 28 leaves the engine at a higher velocity than when it entered. The bypass flow stream 30 flows through fan rotor 42, flows by bypass duct outer wall 27 (an annular duct concentric with the core engine), flows through a fan discharge outlet and is expanded through an exhaust nozzle to produce additional thrust. Turbofan engine 10 has a generally longitudinally extending centerline represented by engine axis 46.

The fan 42 generates a significant portion of the propulsive force for the turbofan engine 10. The fan 42 is large, composed of many attached fan blades and may rotate at high speeds to produce thrust. While the likelihood of a failure of one or more blades during operation is low, the consequences of a part of or a whole fan blade being thrown from a fan rotor during flight could lead catastrophic consequences for vital plane systems and passengers. To lessen the risks presented by a lost fan blade, turbine engines may use a containment system to capture any loose blades and absorb the energy from their impact. Such containment systems are particularly important in applications which use a composite containment case because composite material may be much more easily cut by a loose fan blade than a metal containment case.

A detailed illustration of a containment assembly of a turbine engine is shown in FIG. 2. The assembly 200 comprises a casing 202, a fan track liner 204, rotor 290, centerline axis 246, engine interface 208 and fan 242 (shown as a single fan blade). The fan blades 242 are attached to rotor 290 which spins about the centerline axis of the engine 246. The fan 242 spins into the page, as shown by arrow 216, compressing the incoming airstream 212.

Casing 202 provides support for the fan track liner 204 and may be connected to engine interface 208 via bolts 206 or other connection means. The casing 202 may be made of metal, composite, or a combination of the two materials. The casing 202 may be referred to as a fan-containment case. Composite materials are advantageous over metal casings in that they can support normal operating engine loads at greatly reduced weights. However, composite materials may be more susceptible to being damaged by, for example, a thrown fan blade than a metal containment case.

Due to this susceptibility to damage to casing 202, a fan track liner 204 is attached to the inner (inboard) radial wall of the casing 202 to absorb and redistribute the impact energy of a thrown blade, thereby avoiding localization of energy which would otherwise have been imparted onto the casing 202. A typical energy-absorbing fan track liner comprises a multilayer honeycomb and facesheet design which may be designed to fail in a staged sequence in order to protect the casing 202. The fan tracker liner 204 may be comprised of a plurality of subassemblies 318, for example, between five and eight, arranged radially outward from and circumferentially around the fan 242 as seen in FIG. 3. The liner 204 may extend axially forward and aft of the furthest upstream and downstream parts, respectively, of the fan blade to accommodate any axial movement of a blade after becoming loose from the fan. The fan track liner 204 is often bonded to the inner radial wall of the casing 202 such that the subassemblies 318 form a joint at which there is a discontinuity of energy-absorbing layers.

An axial cross-sectional view of a turbine engine 300 is shown in FIG. 3. This cross-section may be taken from a turbine engine such as that shown in FIG. 1 at section A-A. The engine 300 includes a casing 302, a fan track liner 304 and rotor 390. The casing 302 and fan track liner 304 may be commonly referred to as a containment assembly 322. The rotor spins in a counter-clockwise direction about the centerline axis 346 as shown by arrow 316. A fan is not shown because the cross-section is taken just forward of the fan. The inlet air flow direction is shown by arrow 312.

The casing 302 circumscribes the rotor 390 and is outboard of the rotor 390 and the fan track liner 304. The casing 302 may comprise materials as described above.

The fan track liner 304 circumscribes the rotor 390 and is inboard of the casing 302. The fan tracker liner 304 may comprise a plurality of subassemblies 318, also known as panels or crush panels, for example, five or eight subassemblies. The fan track liner is divided into subassemblies for manufacturing and engine assembly purposes. The subassemblies 318 may comprise the materials and construction as described above.

As can be seen in FIG. 3, the subassemblies 318 join one other at a series of joints 320 located circumferentially around the axis 346. These joints 320 are end-to-end butt joints with the joint 320 oriented in the radial direction. A close up of an end-to-end butt joint in a containment assembly 400 is shown in FIG. 4. The containment assembly 422 comprises casing 402 and fan track liner 404, liner 404 comprising a plurality of subassemblies 418. The subassemblies 418 meet at an end-to-end butt joint 420. The fan 442 rotates counterclockwise around the centerline axis (not shown) as indicated by direction arrow 416. Subassemblies 418 may be of a multilayer design comprising facesheet 432 and an energy-absorbing layer 434, which may be of a metallic honeycomb design.

The end-to-end butt joint method of joining the subassemblies 318/418 provides a discontinuity in the facesheet and/or honeycomb material running circumferentially around the engine, leading to a sharp drop in stiffness at the joint location that can permit the blade to penetrate to deeper layers at the joint. This discontinuity severely impacts the transfer of blade load across the joint surface, resulting in blade impact behavior that differs at the joint 320/420 as opposed to at the center of the panels 318/418. Other designs use a perpendicular or adjacent ninety degree upturn joint which may lead to an overly stiff joint that may concentrate an impact load on a small area of the barrel (or casing) in the vicinity of the joint, thereby potentially causing damage.

With reference to FIG. 2, the energy-absorbing effectiveness of the fan track liner 204 is highly correlated to the overall thickness of the liner 204. However, the maximum thickness of the liner is limited by overall plane design criteria to include engine nacelle size limitations, casing 202 load bearing requirements and the size of the engine equipment. Some designs create an "arched" casing 202 in which the casing inner wall proximate to the fan track liner section is pushed outwardly. While such a design allows for thicker fan track liners, this casing must be formed by fusing at least two separate components because the entire arched-design casing cannot be removed from the mandrel around which it is modeled without cutting the casing or destroying the mandrel. A casing formed by fusing two separate sections is inherently weaker than a casing formed from continuous plies.

As disclosed in some embodiments herein the current subject matter addresses these deficiencies by utilizing an angled upturn joint between adjoining subassemblies (or panels) of a fan track liner. The angled upturn joint allows smooth transition of a crushing load from a leading subassembly panel to the energy absorbing layers of a trailing subassembly panel to which the leading subassembly panel is joined. The angled upturn joint further mitigates damage to the casing to which the subassemblies are attached when compared to joining methods which create large discontinuities in stiffness at the joints. The use of an angled upturn joint also permits co-curing of the septum resin and the energy-absorbing layer adhesive, thereby enabling a certain amount of consolidation of the inner septum at the angled upturn joint.

The disclosed subject matter in accordance with some embodiments also addresses the limitations on fan track liner thickness and two-part casings by embedding a layer of the fan track liner within the layup of the casing. This creates a containment casing have an embedded containment core. The load carrying fibers of the containment casing having an embedded core may be pushed to the outboard side of the casing. The inner fibers, or plies, effectively serve as a load transfer septum between the energy-absorbing layers of the fan tracker liner bonded to the inner radial surface of the containment casing having the embedded energy absorbing layer, and may replace the bespoke intermediate glass septum used in other applications. This may maximize the thickness of the impact energy absorbing fan track liner, and may take advantage of additive manufacturing methods of composite component fabrication by including the layer of energy-absorbing honeycomb into the composite layup. Some embodiments may include either aramid fiber or metallic honeycomb.

In accordance with some embodiments of the present disclosure, a machine having a containment assembly is provided. The machine may have a rotor which is at least partially bounded by the containment assembly. The containment assembly comprises a casing and a containment liner. The casing may have a radially inner surface facing the rotor. The containment liner may be formed from a plurality of panels bonded to the radially inner surface of the casing. The panels may form joints between adjacent leading and trailing panels relative to the direction of the rotation of the rotor. At least one of the joints includes a portion of a trailing panel position radially outboard of a portion of the leading upstream panel.

In accordance with some embodiments of the present disclosure, a turbine engine having a containment assembly is provided. The turbine engine may have a fan that is radially bounded at least in part by the containment assembly. The containment assembly comprises a casing and a fan track liner. The casing may have a radially inner surface facing the fan. The fan track liner may be formed from a plurality of panels bonded to the radially inner surface of the casing. The panels may form joints between adjacent leading and trailing panels relative to the direction of the rotation of the fan. At least one joint includes a portion of a trailing panel positioned radially outside of a portion of the leading upstream panel. The joint may be formed from a continuous joint surface of said leading panel and a continuous joint surface of the trailing panel.

In accordance with some embodiments of the present disclosure, a rotating machine having a containment assembly is provided. The rotating machine may have at least a portion bounded by the containment assembly. The containment assembly may comprise a casing and a plurality of containment liners. The casing may have a radially inner surface. One of the containment liners may be bonded to the radially inner surface of the casing and at least one liner may be bounded to and radially inboard of the liner bonded to the casing. Each of the liners may comprise a plurality of subassemblies. Each pair of adjacent subassemblies may form a joint wherein at least a portion of a trailing subassembly is positioned radially outward of a portion of said leading subassembly.

These and many other advantages of the present subject matter will be readily apparent to one skilled in the art to which the disclosure pertains from a perusal of the claims, the appended drawings, and the following detailed description of preferred embodiments.

DETAILED DESCRIPTION

Figure 1:
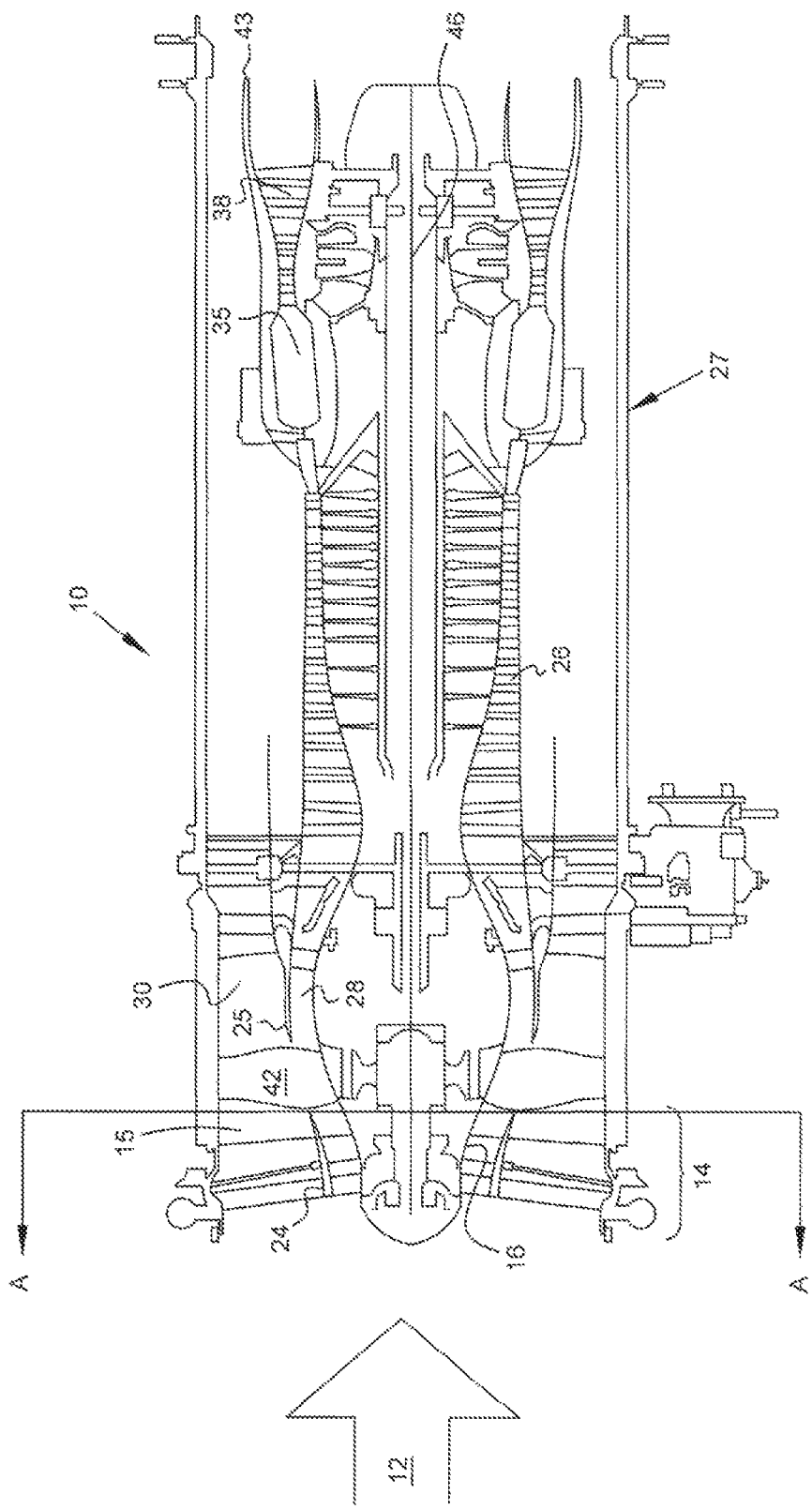
FIG. 1 is an illustration representing conventional turbofan engines.
Figure 2:
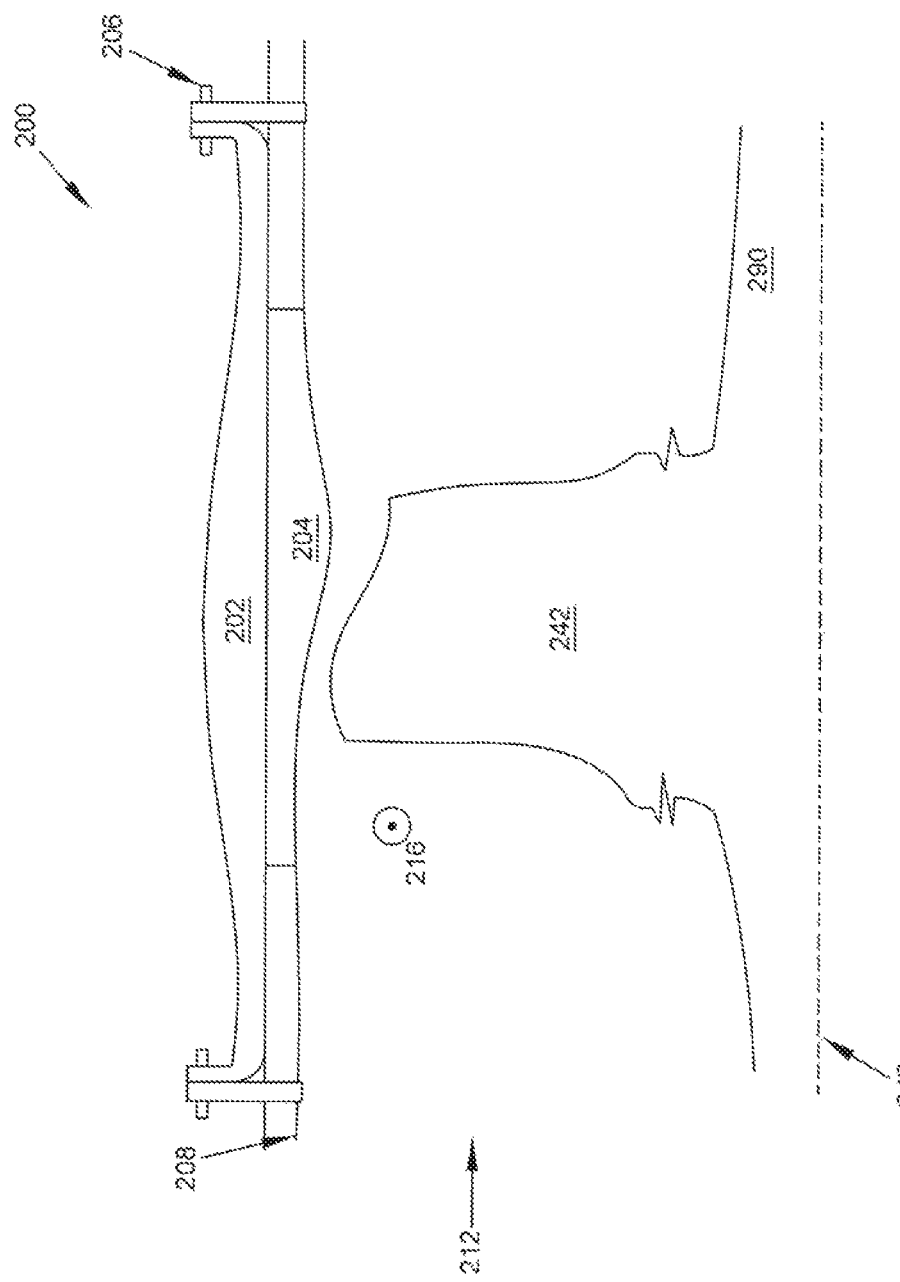
FIG. 2 is an illustration of a close-up, axial view of a fan containment assembly.
Figure 3:
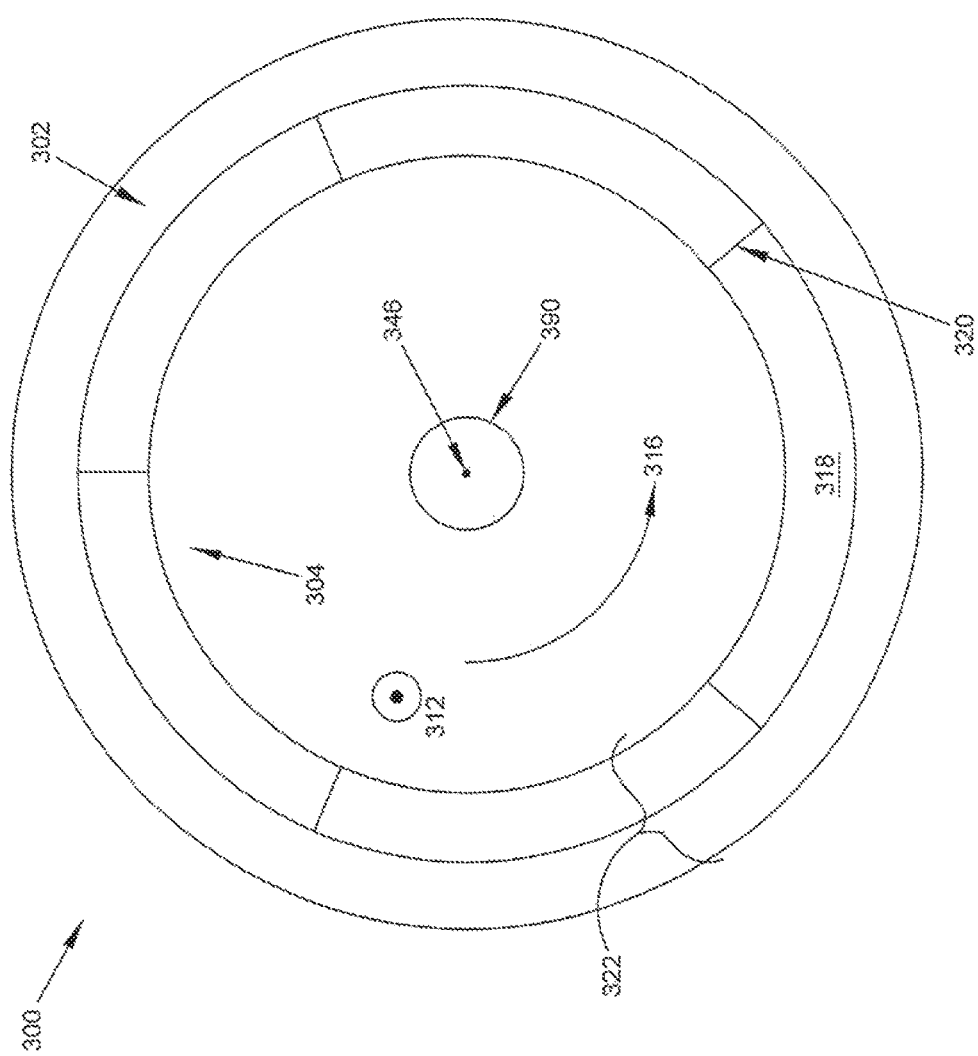
FIG. 3 is a cross-sectional view of a fan containment assembly.
Figure 4:
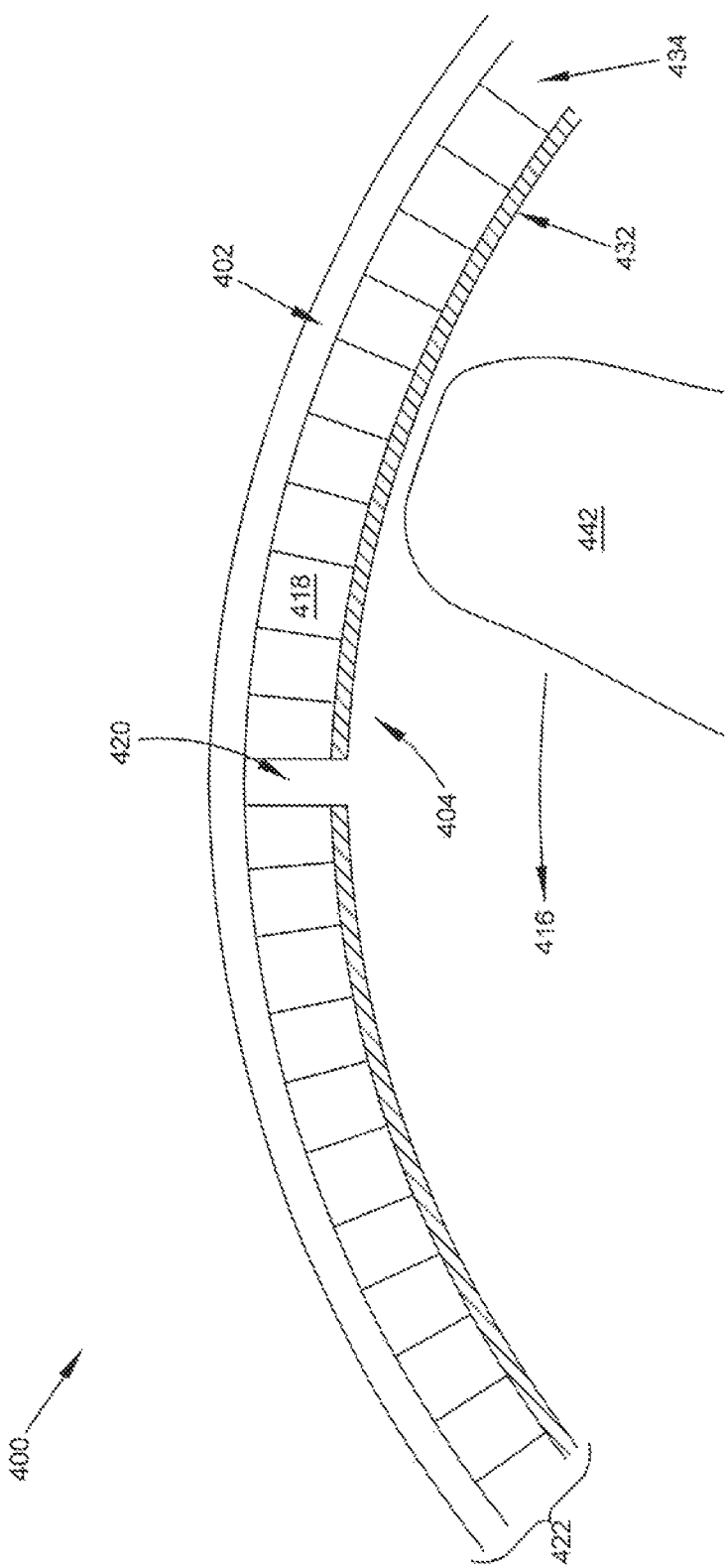
FIG. 4 is an close-up, cross-sectional view of a fan containment assembly.
Figure 5:
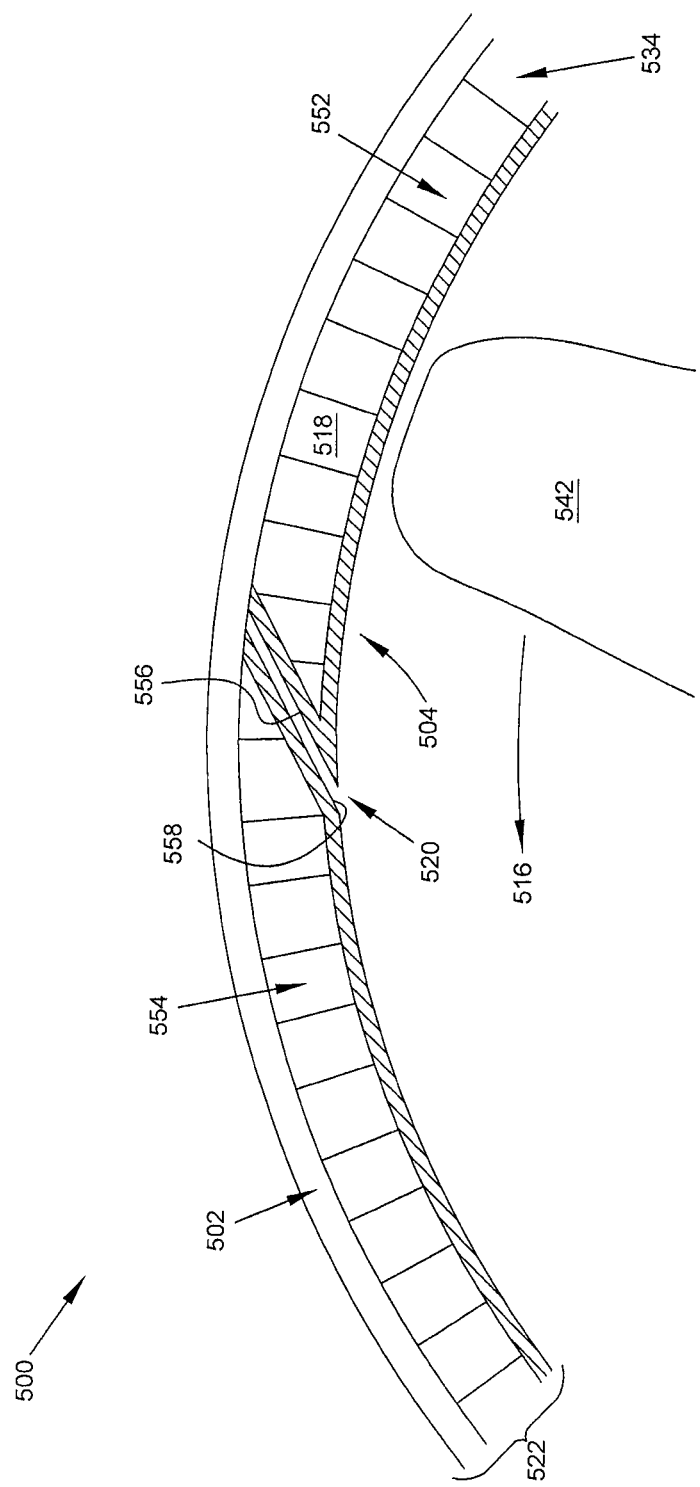
FIG. 5 is an close-up, cross-sectional view of a fan containment assembly according to some embodiments of the present disclosure.

In accordance with some embodiments of the present disclosure, a fan containment assembly 500 is presented as shown in the cross-sectional view of FIG. 5. The assembly comprises a casing 502, a fan track liner 504 (which may also be referred to as a containment liner) formed of a plurality of subassemblies, or panels, 518. The subassemblies 518 are bonded to a radially inner surface of the casing 502. The casing 502 and the panels 518 may be collectively referred to as a containment assembly 522. The containment assembly 522 radially bounds at least a portion of a rotor (not shown) to which the blades of fan 542 are attached. Joints, such as joint 520, are formed between adjacent panels 518. For reference, the direction of the rotor is defined by arrow 516.

The joint 520 is defined by surfaces of two adjoining panels. Being located upstream (in the rotational direction 516 of fan 542) of panel 554, panel 552 may be referred to as the leading and/or upstream panel. Panel 554 may be referred to as the downstream or trailing panel being located downstream, in the rotational direction 516 of fan 542, of panel 552.

In some embodiments, the surfaces 556, 558 define the joint 520. Surfaces 556 and 558 may be referred to as a joint surfaces. Each surface 556, 558 forms the circumferential end of panel 552, 554, respectively, and may axially extend along the rotor (not shown) for all or a portion of the axial width of the fan track liner 504. The surfaces 556, 558 may be continuous in that any changes to the surface shape are smooth. The particular shape of a joint surface may comprises other shapes than that shown in FIG. 5. Examples of possible joint surface shapes may be seen in FIGS. 7A-7E.

The joint 520 may also be defined by the relative radial position of the panels 552 and 554 and their respective joint surfaces. As shown in FIG. 5, joint 520 includes at least a portion of trailing panel 554 which is positioned radially outboard of at least a portion of panel 552, giving joint 520 an angled, upturn design. This arrangement of the panels 552 and 554 improves the load transfer behavior of the fan track liner 504 and nearly replicates the impact performance of a jointless fan track liner. In the event of an impact at the location of joint 520, the angled upturn design of joint 520 permits a smooth circumferential load transfer between panels 552 and 554. Transferring loads between panels is a critical function for the fan tracker liner, particularly for containment assemblies comprising a composite fan case, because the liner serves as an energy absorbing and distribution mechanism which protects the case from localized damage.

A joint designed like joint 520 avoids the stiffness discontinuities associated with other joint designs which could damage the casing 502. Further, joint 520 prevents or minimizes the likelihood that a projectile blade could penetrate deeper into the energy-absorbing layer(s) of the subassemblies or dig underneath the adjacent, downstream panel. Additionally, use of the angled upturn joint 520 allows the panel septum and honeycomb adhesive material to be co-cured at the joint surface.

The panels or subassemblies 552 and 554 of the liner 504 may comprise a multilayer design. For example, a panel may comprise an radially inner facesheet facing the fan 542, a radially outer facesheet bonded to an inner radial surface of casing 502, and an energy-absorbing layer 534. The multilayer design may comprise a greater or fewer number of facesheets and more than one energy absorbing layer. The energy absorbing layer 534 may comprise a metallic honeycomb or other design. The facesheets may comprise a composite material which may include unidirectional tape, automated fiber placement, woven or braided materials. The composite material may comprise carbon.

Figure 6:
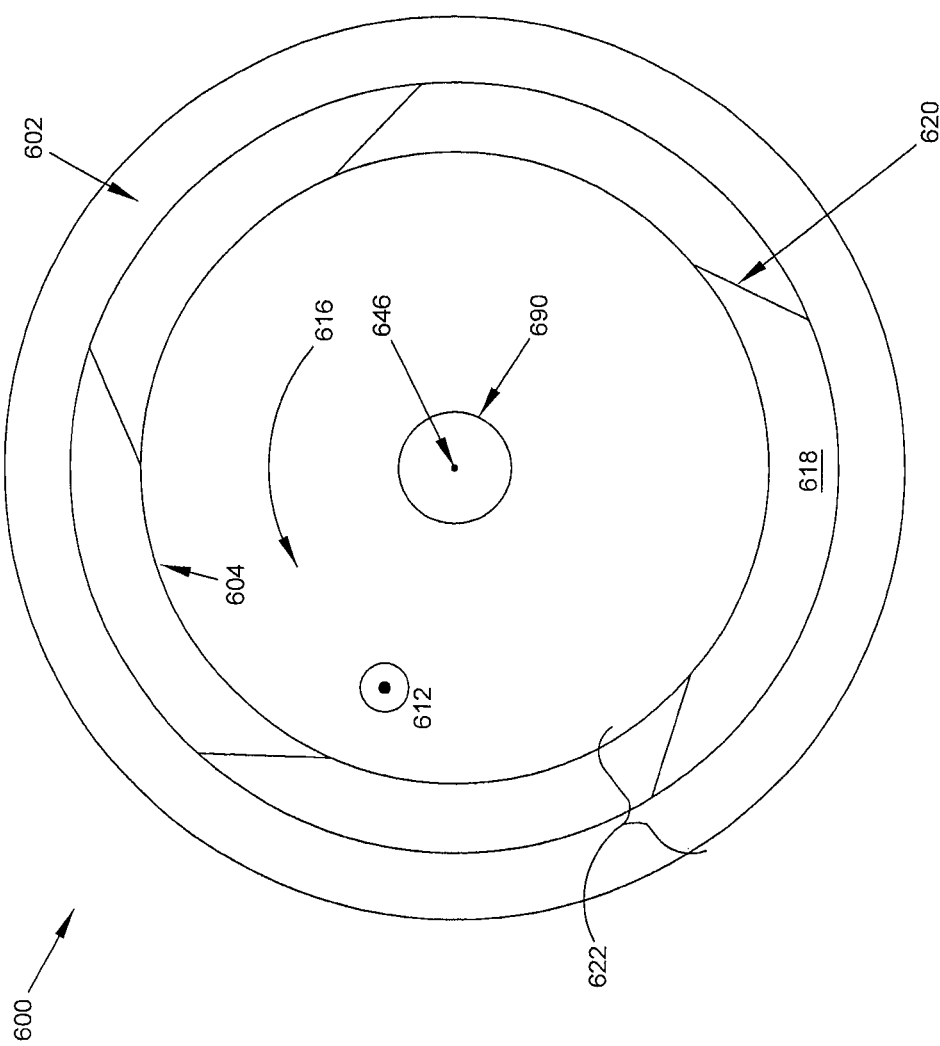
FIG. 6 is a cross-sectional view of a fan containment assembly according to some embodiments of the present disclosure.
Figure 7A:
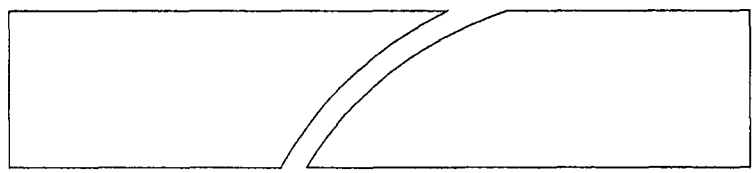
FIGS. 7A-7E are illustrations of various embodiments of subassembly joints in accordance with some embodiments of the present disclosure.
Figure 7B:
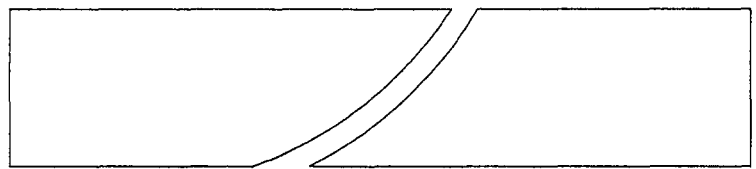
Figure 7C:
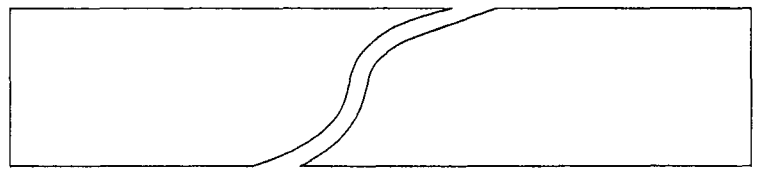
Figure 7D:
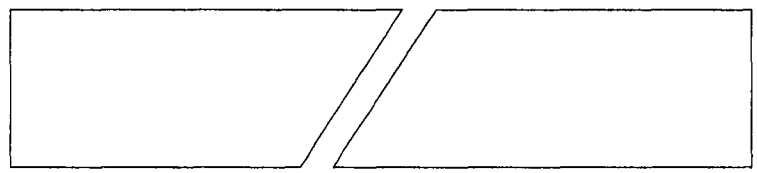
Figure 7E:

In accordance with some embodiments of the present disclosure, a cross-sectional view of fan containment assembly 600 is presented in FIG. 6. The assembly 600 comprises casing 602 and fan track liner 604. The fan track liner comprises a plurality of subassemblies or panels 618 bonded to a radially inner surface of the casing 602. Both the casing 602 and liner 604 are located radially outboard of a rotor 690 to which a fan (not shown) may be fixed. Casing 602 and liner 604 may be referred to as a containment assembly 622. The rotor 690 rotates in the direction 616 about axis 646. The panels 618 may each be constructed as described above. The panels 618 may form joints 620 which are of an angled upturn design defined by two adjoining, continuous surfaces. The direction of airflow is shown by 612.

Casing 602 may comprise a composite material and further define a generally cylindrical opening. In some embodiments the cross sectional area of the fan case 602 may be oval to provide a greater distance between the casing 602 and the fan (not shown) it bounds. This may allow the use of additional layers for the liner 604, or use of thicker layers in some areas to provide additional protection against blade fragments. For example, thicker liners could be used on the radially inner wall of the casing 602 which faces the plane fuselage or other areas. In some embodiments the casing 602 may comprise a cylindrical opening in which the turbine fan rotates.

Figure 8A:
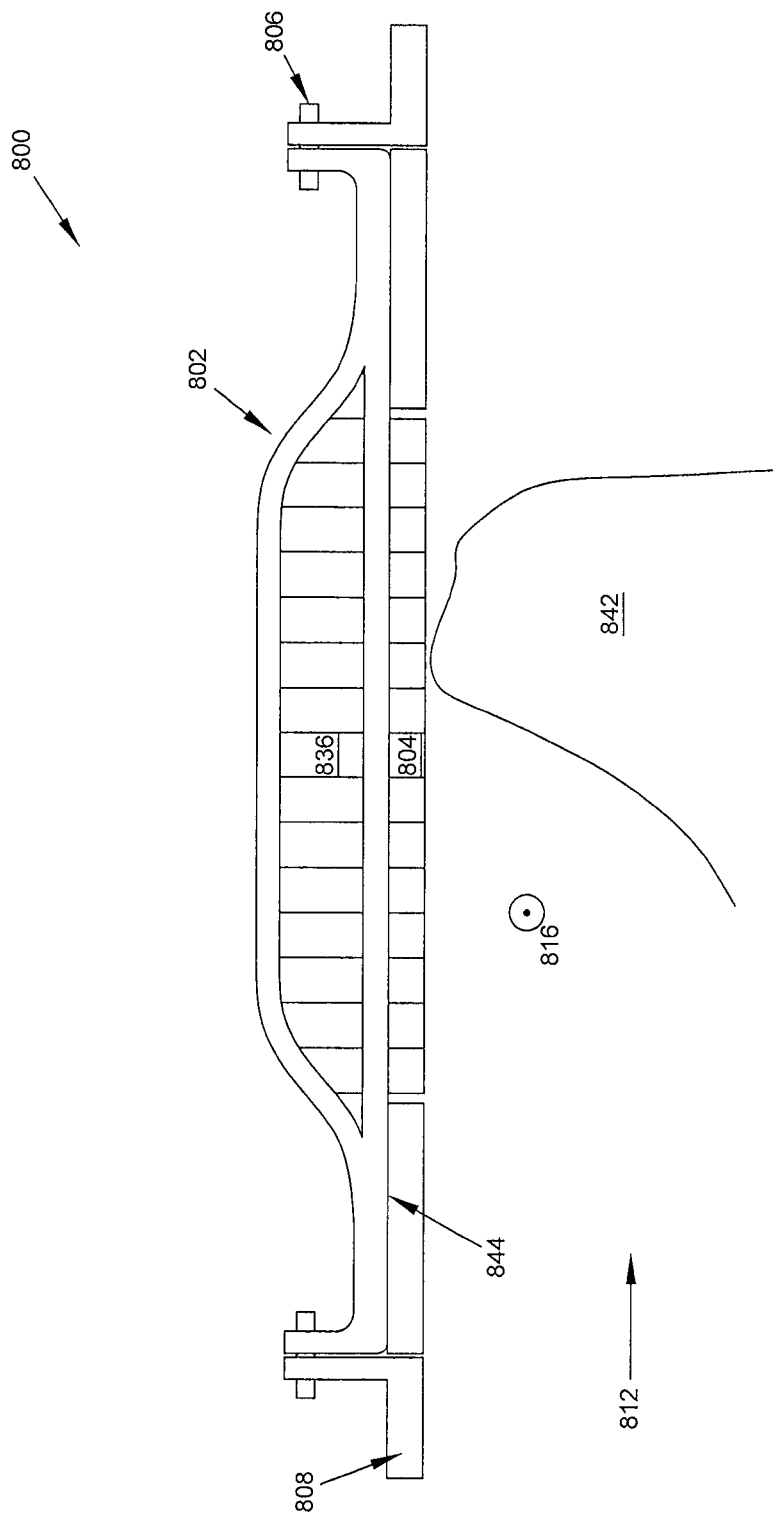
FIG. 8A is an illustration of an axial cutaway of a fan containment assembly according to some embodiments of the present disclosure.
Figure 8B:
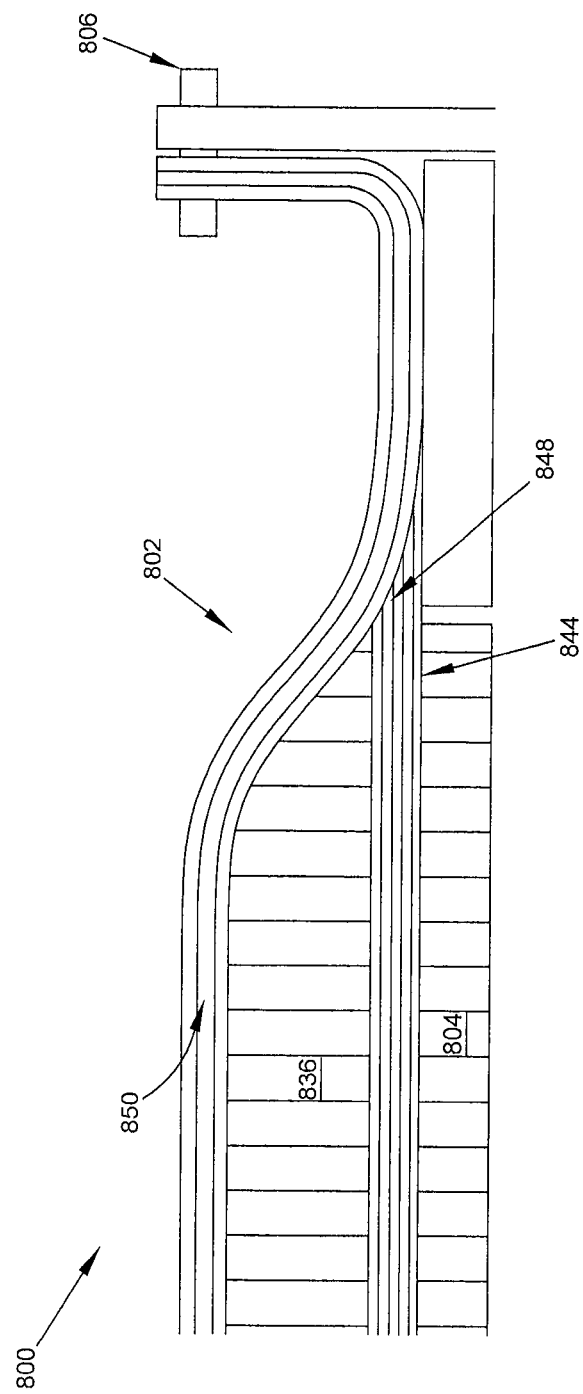
FIG. 8B is an illustration of a close-up of an axial cutaway of a portion of a fan containment assembly according to some embodiments of the present disclosure.

In accordance with some embodiments of the present disclosure, a containment assembly having a casing and an embedded containment core is presented. The casing may be a fan containment case of a turbine engine and the core may be an energy-absorbing layer. A cross-section of a containment casing having an embedded containment core is illustrated in FIG. 8A and FIG. 8B. The containment assembly 800 may comprise a casing 802 and a fan track liner 804. The assembly 800 radially bounds a rotor (not shown) to which fan blades 842 are attached. The fan blades 842 and rotor rotate in direction 816. The assembly 800 may be attached to the engine 808 via bolts 806 or other attachment mechanism. Air flows into the fan 842 from left to right as indicated by direction 812.

The casing 802 may have a radially inner surface 844 facing the rotor, an inner casing member 848 (see FIG. 8B) formed from a composite material positioned between the inner surface 844 and an embedded core 836, and an outer casing member 850 formed from composite material positioned outboard of the core 836. The casing 802 has a first and second end located at the axial extremes of the casing. These ends may form attachment flanges through which bolts 806 are placed to secure the casing 802 to the rest of the engine.

The outer casing member 850 may be formed multiple plies of composite materials as shown in FIG. 8B. In some embodiments, the attachment flanges are also formed from the same continuous plies of composite material from which the outer casing member 850 is composed. These plies form a rigid backbone of the fan case running between the first and second end. This "backbone" is preferably placed outboard of any energy absorbing layers to minimize the likelihood of damage to it from any blade impact.

In some embodiments the inner casing member 848 may also be formed from continuous plies of composite materials. However, these inner plies may terminate short of the first and second ends and/or the attachment flanges interface location because the inner casing member 848 is not intended to carry the load of an impact. Rather, the inner casing member 848 may serve only as a load-transfer septum between adjacent energy-absorbing layers. The inner and outer casing members 848, 850 may comprise prepreg carbon composite material constructed using unidirectional tape, automated fiber placement, woven or braided material. The inner and outer casings also encapsulate the embedded core, fully sealing it from water ingress.

The embedded core 836 may be disposed between the inner and outer casing members 848, 850 and may be an energy-absorbing layer as described above.

In accordance some embodiments of the present disclosure, the inner casing member 848, outer casing member 850 and embedded core 836 are formed on a mandrel and cured as a unitary structure. The inner surface 844 and the outer casing member 850 may be formed together such that they define a continuous cylindrical or generally cylindrical opening in which the fan 842 rotates. By forming these components together, the unitary containment casing can be easily removed from the molding mandrel unlike a crowned or converging-diverging cross section containment case. Forming the casing, particularly the outer casing member 850, with continuous, uninterrupted piles provides a lighter and stronger casing 802.

Figure 9:
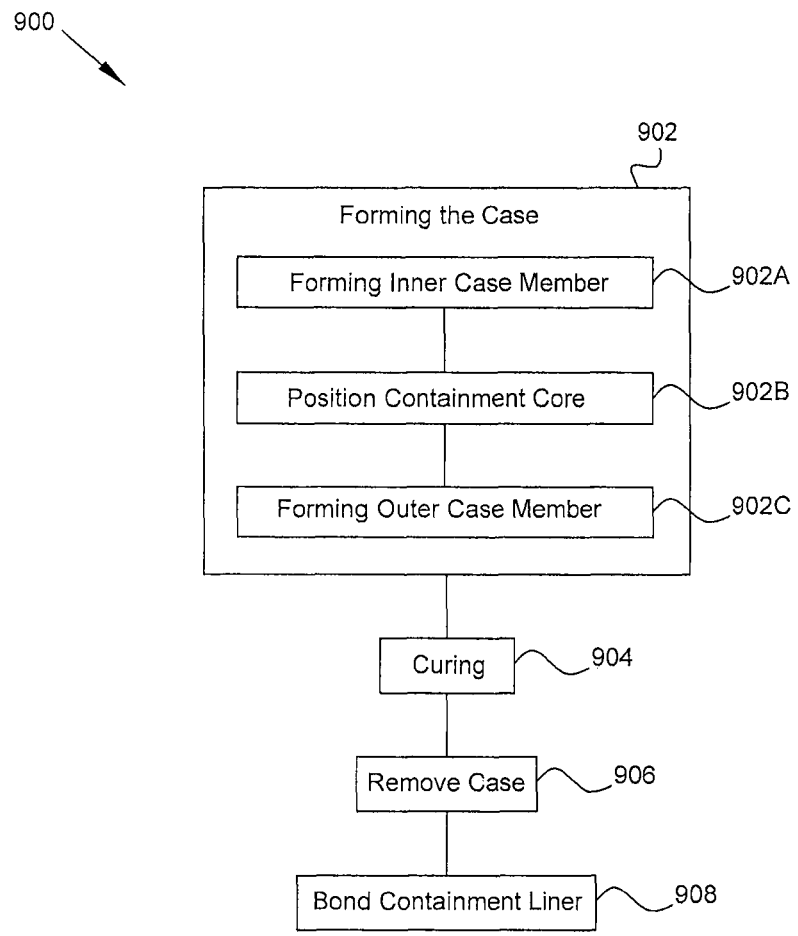
FIG. 9 is a flow diagram of a method of manufacturing a containment casing in accordance with some embodiments of the present disclosure.

A method 900 of making a containment assembly for radially bounding a rotor in accordance with some embodiments of the present disclosure is presented. The method, as shown in FIG. 9, comprises forming a casing on a mandrel (block 902), curing the casing (block 904) and removing the casing from the mandrel (block 906). The casing may be formed by forming an inner casing member on the surface of a mandrel (block 902A), positioning a containment core on the outer surface of the inner casing member (block 902B) and forming an outer casing member thereby embedding the core between the inner and outer casing members (block 902C). An additional containment liner, which may be a fan track liner, may be bonded to a radially inner surface of the casing (block 908).

While some of the above embodiments have been provided in the context of a turbine engine, it will be understood that the above embodiments disclose improvements to containment apparatuses used in any rotating machine. While preferred embodiments of the present disclosure have been described, it is to be understood that the embodiments described are illustrative only and that the scope of the disclosure is to be defined solely by the appended claims when accorded a full range of equivalence, many variations and modifications naturally occurring to those of skill in the art from a perusal hereof.

I claim:

1. A machine having a rotor radially bounded at least in part by a containment assembly, the containment assembly comprising:
   a casing having a radially inner surface facing the rotor; and
   a containment liner formed from a plurality of panels, including a first panel, a second panel adjacent to and upstream of said first panel, and a third panel adjacent to and downstream of said first panel, bonded to the radially inner surface of said casing forming a respective one of a plurality of joints between a respective leading panel and a respective trailing panel relative to a direction of rotation of said rotor, wherein each of the panels includes a leading side, a trailing side, a radially outer side, and a radially inner side, the leading side opposite of the trailing side, and the radially outer side opposite the radially inner side, wherein the radially outer side and the radially inner side each extend from the trailing side to the leading side, wherein the radially outer side and the radially inner side are each longer in length than the trailing side and the leading side, wherein the radially outer side of each of the panels is bonded to the radially inner surface of the casing, and the radially inner side of each of the panels faces the rotor, wherein the trailing side of the respective leading panel faces the leading side of the respective trailing panel such that the respective one of the plurality of joints is formed between the leading side of the respective trailing panel and the trailing side of the respective leading panel, wherein the plurality of joints includes a first joint and a second joint, wherein the respective leading panel and the respective trailing panel are adjacent to each other, including the first joint formed between said first and second panels, and the second joint formed between said first and third panels, wherein each of said first joint and said second joint includes a portion of the respective trailing panel positioned radially outside of and overlapping a portion of the respective leading upstream panel.

2. The assembly of claim 1, wherein an angle measured between a side of at least one of said first joint and said second joint and a radial vector is 45 degrees.

3. The assembly of claim 1, wherein said radially inner surface of said casing defines a generally cylindrical opening.

4. The assembly of claim 1, wherein said radially inner surface of said casing defines a cylindrical opening.

5. The assembly of claim 1, wherein said panels comprise a facesheet and an energy absorbing layer, wherein the facesheet extends over the respective leading side and the respective trailing side.

6. The assembly of claim 5, wherein said energy absorbing layer is of a metallic honeycomb design.

7. The assembly of claim 5, wherein said facesheet comprises a composite material selected from the group consisting of unidirectional tape, automated fiber placement, woven and braided material.

8. The assembly of claim 7, wherein said composite material comprises carbon.

9. The assembly of claim 5, wherein said panels further comprise an adhesive that adheres a septum and a honeycomb co-cured at the first joint, at the second joint, or at both the first joint and the second joint, wherein the trailing side of the respective leading panel of the respective first or second joint and the leading side of the respective trailing panel of the respective first or second joint are not in direct contact.

10. The assembly of claim 1, wherein said casing comprises a composite material.

11. The assembly of claim 1, wherein said machine is a turbine.

12. The assembly of claim 11, wherein said containment assembly radially bounds a fan.

13. The assembly of claim 11, wherein said containment liner is a fan track liner.

14. A turbine engine having a fan radially bounded at least in part by a containment assembly, the containment assembly comprising:

a casing having a radially inner surface facing said fan; and a fan track liner formed from a plurality of panels bonded to the radially inner surface of said casing forming a respective one of a plurality of joints between a respective leading panel and a respective trailing panel relative to a direction of rotation of said fan, wherein each of the panels includes a leading side, a trailing side, a radially outer side, and a radially inner side, the leading side opposite of the trailing side, and the radially outer side opposite the radially inner side, wherein the radially outer side and the radially inner side each extend from the trailing side to the leading side, wherein the radially outer side and the radially inner side are each longer in length than the trailing side and the leading side, wherein the radially outer side of each of the panels is bonded to the radially inner surface of the casing, and the radially inner side of each of the panels faces the fan, wherein the trailing side of the respective leading panel faces the leading side of the respective trailing panel such that the respective one of the plurality of joints is formed between the leading side of the respective trailing panel and the trailing side of the respective leading panel, wherein the respective leading panel and the respective trailing panel are adjacent to each other, wherein each of said joints includes a portion of the respective trailing panel positioned radially outside of and overlapping a portion of the respective leading upstream panel, and wherein each of said joints is formed by the trailing side of said respective leading panel and the leading side of said respective trailing panel.

15. The turbine engine of claim 14, wherein the trailing side of said respective leading panel is concave.

16. The turbine engine of claim 14, wherein at least a portion of the trailing side of said respective leading panel is convex.

17. The turbine engine of claim 16, wherein at least a portion of the trailing side of said respective leading panel is concave.

18. The turbine engine of claim 14, wherein said radially inner surface of said casing defines an oval opening.

19. A rotating machine having a rotor, wherein at least a portion of the machine is bounded by a containment assembly, said containment assembly comprising:

a casing having a radially inner surface; and a plurality of containment liners, wherein one of said containment liners is bonded to the radially inner surface of said casing and said one of said containment liners comprises a radially inner surface, and at least one additional liner comprising a radially outer surface, wherein said radially outer surface of said at least one additional liner is bonded to and in contact with said radially inner surface of said one of said containment liners wherein each of said containment liners comprises a plurality of subassemblies, each pair of circumferentially adjacent subassemblies forming a joint, wherein at least a portion of a respective trailing subassembly is positioned radially outward of a portion of a respective leading subassembly, wherein each of the subassemblies includes a leading side, a trailing side, a radially outer side, and a radially inner side, the leading side opposite of the trailing side, and the radially outer side opposite the radially inner side, wherein the radially outer side and the radially inner side each extend from the trailing side to the leading side, wherein the radially outer side and the radially inner side are each longer in length than the trailing side and the leading side, wherein the radially outer side of each of the subassemblies is bonded to the radially inner surface of the casing, and the radially inner side of each of the subassemblies faces the rotor, wherein the trailing side of the respective leading subassembly faces the leading side of the respective trailing subassembly such that the joint is formed between the leading side of the respective subassembly and the trailing side of the respective leading subassembly.

* * * * *